(12) United States Patent
Poplawski

(10) Patent No.: US 11,466,965 B2
(45) Date of Patent: *Oct. 11, 2022

(54) HANDHELD NON-LETHAL DAZZLING SYSTEM

(71) Applicant: Daniel Poplawski, Oswego, IL (US)

(72) Inventor: Daniel Poplawski, Oswego, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,099

(22) Filed: Jul. 20, 2021

(65) Prior Publication Data

US 2021/0348890 A1 Nov. 11, 2021

Related U.S. Application Data

(63) Continuation of application No. 16/887,961, filed on May 29, 2020, now Pat. No. 11,098,987, which is a continuation of application No. 16/382,290, filed on Apr. 12, 2019, now Pat. No. 10,712,131.

(60) Provisional application No. 62/657,291, filed on Apr. 13, 2018.

(51) Int. Cl.
| | | |
|---|---|---|
| *F21V 23/00* | (2015.01) | |
| *F41H 13/00* | (2006.01) | |
| *G02B 23/18* | (2006.01) | |
| *F21V 23/04* | (2006.01) | |
| *G02B 7/06* | (2021.01) | |
| *F21W 131/40* | (2006.01) | |
| *F21Y 115/30* | (2016.01) | |

(52) U.S. Cl.
CPC ....... *F41H 13/0056* (2013.01); *F21V 23/003* (2013.01); *F21V 23/0414* (2013.01); *G02B 7/06* (2013.01); *G02B 23/18* (2013.01); *F21W 2131/40* (2013.01); *F21Y 2115/30* (2016.08)

(58) Field of Classification Search
CPC ........................... F21V 23/0414; F21V 23/003
See application file for complete search history.

(56) References Cited

U.S. PATENT DOCUMENTS 7,239,655 B2 * 7/2007 Casazza .............. F41H 13/0056
372/36

* cited by examiner

*Primary Examiner* — Vip Patel
(74) *Attorney, Agent, or Firm* — The Law Offices of Konrad Sherinian, LLC

(57) ABSTRACT

A non-lethal dazzling device includes a laser operable in the visible spectrum. The laser can be a relatively low-powered laser, such as a laser having a maximum output power of 2.5 mW, or it can be a higher-powered laser with a drive circuit that lowers the maximum output power to a safe level based on the range of the hostile target from the laser. In certain embodiments, the disclosed non-lethal dazzling device can be coupled to the bridge of a binocular device.

16 Claims, 7 Drawing Sheets

*Fig. 3*
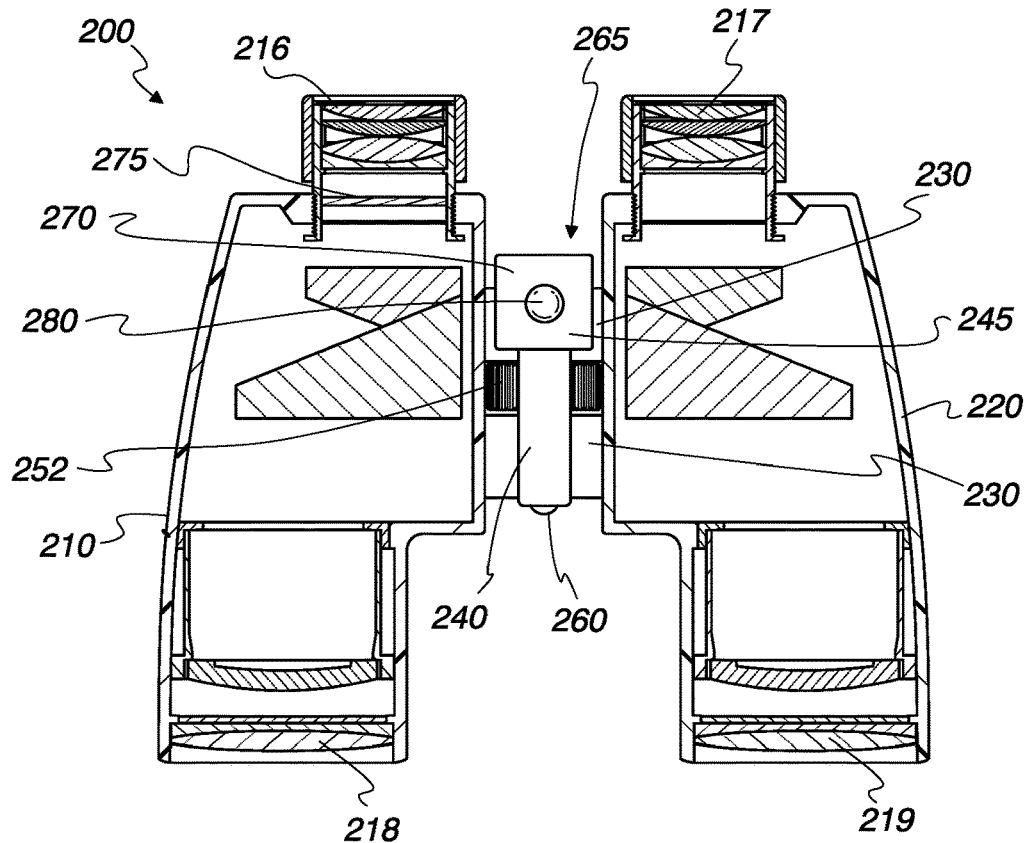
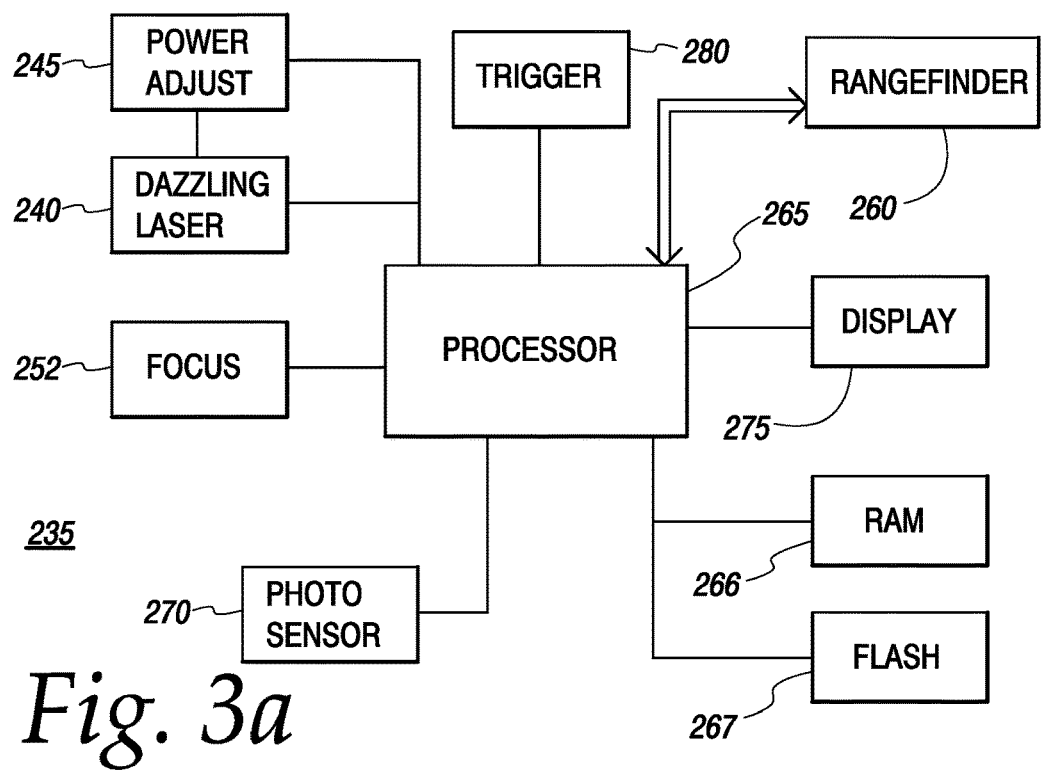
*Fig. 3a*

HANDHELD NON-LETHAL DAZZLING SYSTEM

CROSS REFERENCE TO RELATED APPLICATIONS

The present disclosure is a continuation of U.S. patent application Ser. No. 16/887,961, filed on May 29, 2020 on behalf of inventor Daniel Poplawski, which claims priority of U.S. patent application Ser. No. 16/382,290, filed on Apr. 12, 2019, which claims priority to U.S. Provisional Patent Application No. 62/657,291, which was filed on Apr. 13, 2018 on behalf of inventor Daniel Poplawski, all of which are hereby incorporated by reference in the entirety.

FIELD OF THE DISCLOSURE

The present invention generally relates to non-lethal laser devices, and more particularly, to the use of non-lethal lasers and non-lethal laser systems for dazzling or stunning persons, as well as to methods of deploying the same.

DESCRIPTION OF BACKGROUND

In recent years, the issue of mass shootings has risen to national prominence. In particular, publicly available data shows that there were at least 146 mass shootings in the United States between 1967 and 2017, with an average of eight fatalities (including the perpetrator); here we are using the definition of at least four or more persons shot or killed as comprising a mass shooting—other definitions result in far higher numbers of mass shootings. Numerous solutions have been proposed to lower the number of mass shootings. These solutions include, for example, banning certain firearms, raising the minimum age of a person to purchase certain firearms, or adding additional mental health requirements for the purchase of a firearm. All of these solutions require changes to the law, which, in the present political climate is far from certain. In addition, various studies appear to demonstrate that some of these solutions may not be effective.

One solution that has been proposed that would not require changing "gun laws" is adding armed guards to various "target" locations, such as schools. For example, it has been proposed to arm school teachers. The viability of such an approach is questionable—school teachers generally are not trained in the use of firearms, and the use of firearms by untrained persons may exacerbate a dangerous situation. In particular, the possibility of an untrained person accidentally harming a child will likely prevent the widespread deployment of armed school teachers. However, the use of a standoff non-lethal device in such a circumstance may be appropriate.

In recent years, security forces, including military and police forces, have deployed non-lethal devices in increasing numbers. For example, high intensity and laser light can present a glare that degrades vision and cause discomfort for the target. High-intensity light can also momentarily blind or dazzle the target, resulting in a temporary loss of visual sensitivity after the light source is removed, and can potentially result in disorientation and nausea. Lasers have been found to be particularly useful as a non-lethal high-intensity light device. However, lasers can also cause irreversible retinal disorder, which is banned in most cases by the Protocol on Blinding Laser Weapons. Accordingly, a balance must be struck between providing a laser that is intense enough to dazzle a hostile actor, but not intense enough to cause irreversible retinal disorder to a target.

Various guidelines including ANSI Z136.1 have been developed regarding the maximum permissible exposure to laser light that an eye can withstand without suffering irreversible retinal disorder. Generally, the maximum level of tolerable exposure is a function of the laser wavelength, laser intensity as measured in milliwatts per square centimeter ($mW/cm^2$), and the duration of the exposure. For purposes of calculating the exposure duration, the time is typically assumed to be 0.25 s; i.e., the length of time before a blink is complete.

A number of prior art dazzlers have been developed. In particular, a number of solutions have been developed for or by the United States Military. Some of these can be found in U.S. Pat. Nos. 6,142,650 and 6,431,732. Both of these detail cylindrical hand-held or pedestal mounted laser systems suitable for military use. However, these prior art systems are deficient in a number of ways. First, the use of a hand-held or pedestal mounted laser system can be difficult or inconvenient to aim. Second, the range of the prior art systems is limited, at least partially due to the difficulty in aiming. Third, the prior art systems generally require that the user of the dazzler place herself or himself in harms way. All of these are deficiencies that the present disclosure seeks to overcome.

OBJECTS OF THE DISCLOSED SYSTEMS, METHODS, AND APPARATUS

Accordingly, it is an object of this disclosure to provide a hand-held dazzler that will not cause irreversible retinal disorder to a target's eyes.

Another object of this disclosure is to provide a hand-held dazzler that can be aimed and operated by a person with minimal or no training.

Another object of this disclosure is to provide a hand-held dazzler that can be operated by aiming the dazzler at the hostile target and pressing a single button.

Another object of this disclosure is to provide a hand-held dazzler that can adjust the power level of an integrated laser to avoid causing irreversible retinal disorder to a target's eyes while allowing for a reasonable range.

Another object of this disclosure is to provide a hand-held dazzler that can adjust the power level of an integrated laser to avoid causing irreversible retinal disorder to a target's eyes while allowing for a reasonable range through the use of a manual or electronic range finder.

Another object of this disclosure is to provide a remote operated dazzler that can be used to disable a hostile actor while minimizing the risk to the remote operator.

Another object of this disclosure is to provide a remote operated dazzler that provides a large dazzling field that does not require the remote operator to precisely aim the dazzling device.

Another object of this disclosure is to provide a hand-held dazzler that can interrupt or reduce the laser output when the dazzler detects it is being moved rapidly.

Another object of this disclosure is to provide for the coupling of manual focus with low cost electronic focus confirmation to help ensure the focus distance is confirmed between the manual focus and the electronic confirmation.

Another object of this disclosure is to provide a dazzler that can be disabled remotely and require secondary authentication prior to the laser being enabled.

Another object of this disclosure is to provide a dazzler with limited profile from the emitting end, and an easy to identify shape or color when viewed from the side or top view.

Other advantages of this disclosure will be clear to a person of ordinary skill in the art. It should be understood, however, that a system, an apparatus or a method could practice the disclosure while not achieving all of the enumerated advantages, and that the protected disclosure is defined by the claims.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 3 is a sectional view of one side of an alternative non-lethal dazzling device constructed in accordance with this disclosure.

FIG. 3a is a simplified block diagram of some of the components of the non-lethal dazzling device of FIG. 3.

Figure 1:
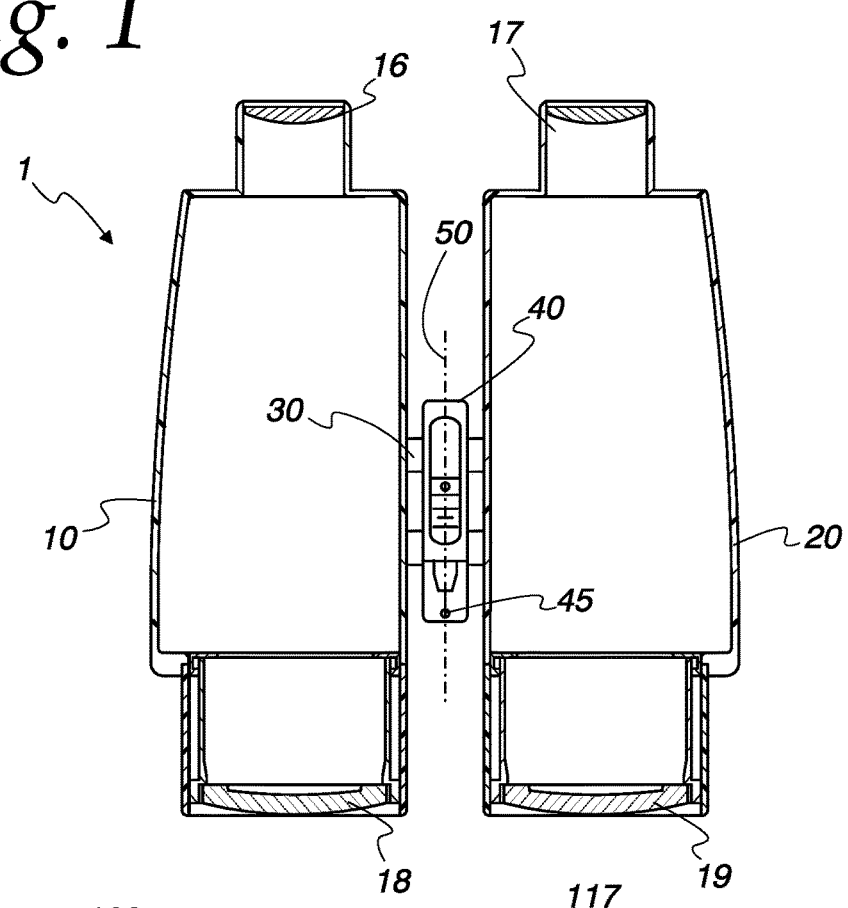
FIG. 1 is a sectional view of the underside of a non-lethal dazzling device constructed in accordance with this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

SUMMARY

Pursuant to the various embodiments, the present disclosure provides a binocular non-lethal dazzling device. In particular, the disclosed binocular non-lethal dazzling device comprises a pair of substantially cylindrical optical housings. Each of the optical housings includes an eye piece, which can include a first lens, a mechanical focal element, such as a system of prisms, and an objective lens. The optical housings are coupled by an articulated bridge. The articulated bridge includes a focus knob, which is coupled to the focal elements of the substantially cylindrical optical housings. Operatively coupled to the articulated bridge is a dazzling module.

The dazzling module comprises a laser drive circuit, at least one activation method such as a pushbutton, and a dazzling laser. The pushbutton is operatively coupled to the laser drive circuit, and causes the laser drive circuit to generate a suitable laser drive power, which is used to activate the dazzling laser. The dazzling laser is adapted to produce a dazzling laser beam which will dazzle a hostile actor without causing irreversible retinal disorder.

In an additional embodiment, the dazzling module of the disclosed binocular non-lethal dazzling further includes a first power programming circuit that is coupled to the pushbutton, which, when activated, causes the laser drive circuit to be programmed to produce a first predetermined laser power level. In addition, the dazzling module could include a second pushbutton that would activate a second power programming circuit that would cause the laser drive circuit to be programmed to produce a second predetermined laser power level. For example, the first predetermined laser power level could correspond to a low (short-range, i.e., less than 50 yards) laser power level, while the second predetermined laser power level could correspond to a high (long-range, i.e., more than 50 yards) laser power level.

In one embodiment, the dazzling module could be coupled to the top or bottom of the articulated bridge. In such an embodiment, the articulated bridge could comprise a pair of hinges, with one coupled to each of the substantially cylindrical optical housings, along with a platform section, which the dazzling module could sit upon.

In a separate embodiment, the dazzling module could be integrated into the articulated bridge. In such an embodiment, the articulated bridge could comprise a single unidirectional hinge disposed between the first substantially cylindrical optical housing and the second substantially cylindrical optical housing. In addition, the dazzling module itself could comprise a substantially cylindrical section disposed with its centerline substantially beneath the unidirectional hinge.

In an additional embodiment, the dazzling module could further comprise a processor coupled to the pushbutton and the laser drive circuit. When the pushbutton is pressed the processor programs the laser drive circuit to produce an appropriate power level. The power level could be set 1) at a predetermined level based on the pushbutton, 2) at a level based on the setting of the focus knob, or 3) at a level based on a rangefinder, or 4) at a level based on the setting of the focus knob and confirmed with a distance based on the rangefinder. With regards to the first possibility; i.e., the power level of the laser being set to a predetermined level based on the pushbutton, multiple pushbuttons could be used, with each resulting in a different power level being generated. With regards to the second possibility, i.e., the power level being based on one or more settings of the focus knob, the different focus settings would be mapped to different ranges, and a power appropriate to the range would be selected. Finally, with regards to the power being set based on a range reported by a range finder or in combination with the focus knob and rangefinder, such an embodiment is explained in more detail below.

In a rangefinder embodiment, the dazzling module would further include a rangefinder transmitter and a rangefinder receiver coupled to the processor. When activated, the rangefinder transmitter would generate a beam and the receiver would monitor reflections from that beam, which would allow the rangefinder receiver to generate a signal (analog or digital) that was proportional to the range from the dazzling and report that range to the processor. The processor would then program the laser drive circuit to generate a laser drive power that was appropriate for the reported range. When used in combination, the binocular would be manually focused and the rangefinder would then be activated to confirm the distance to the target as focused, as well as to match the distance measured by the electronic rangefinder within a predetermined tolerance. As an example, if the actual range to a target is 20 yards, within a 30% focus tolerance, the focal range would be 14 to 26 yards. The distance confirmation would be considered successful if the electronic range finder reported a value between 14 and 26 yards, resulting in a power adjustment at 20 yards of 0.2993 milliwatts using a 532 nm (green) 1.0 milliradian beam divergence laser using the guidelines from ANSI Z136.1.

DETAILED DESCRIPTION

Turning to the Figures and to FIG. 1 in particular, the underside of a non-lethal dazzling device 1 constructed in accordance with this disclosure is depicted. A first housing 10 is joined to a second housing 20 via a bridge 30. The embodiment of FIG. 1 does not incorporate a focal adjustment within the bridge 30; however, it does incorporate a low-powered dazzling laser 40. For example, the dazzling laser 40 can be a Class 3R laser with a power output of, for example, 2.5 milliwatts (mW). A Class 3R laser will generally not cause irreversible retinal disorder during a momentary exposure of less than 0.25 seconds at distances greater than 40 feet, which is within the aversion response; i.e., where a person turns away or blinks to avoid bright light. While a Class 3R laser will not cause retinal disorder, it generally can serve as a distraction, glare, or flashblind hazard.

Each of the housing parts 10, 20 contain an eyepiece 16, 17 and an objective 18, 19. The eyepiece 16, 17 is disposed closest to the user's eye, while the objective lens 18, 19 collects light and brings it into focus for the user. Objective lens 18, 19 may be specially coated to reduce received laser energy that may have been reflected from the target. As the embodiment of FIG. 1 is intended to be simple and low-cost, no mirror or inversion system is used, and no mechanism of focusing the image is provided.

The primary component of a low power laser is a laser diode 45. Such a laser diode can have, for example, a maximum power output of 2.5 mW, a wavelength of 670 nm (nanometers), which would make it a red laser, and be adapted to operate on application of approximately 3V. Diodes with such specifications are readily available; in addition, lasers with similar specifications can be readily substituted. To aid in quickly and easily finding the target, the laser spot size may be expanded from the standard pencil dot size to a larger diameter of about 4 inches. The laser spot size may be controlled to be directly proportional or inversely proportional to the distance to the target. In an embodiment where the laser spot size is inversely proportional to the distance to the target, say the spot size at 10 yards to the target equals 4 inches in diameter, while at 20 yards to the target the spot size equals 3 inches, and at 30 yards to the target the spot size equals 2 inches. On the other hand, in an embodiment where the laser spot size is directly proportional to the distance to the target, say the spot size at 10 yards to the target equals 2 inches in diameter, while at 20 yards to the target the spot size equals 3 inches and at 30 yards to the target the spot size equals 4 inches. The laser at the target may also be rectangular or any other shape that ensures coverage on a face size target, or other predetermined target groups. Other support circuitry is required as well, such as, for example, one or more batteries, a voltage regulator, a capacitor to handle current surges, and a current limiting resistor can all be used. However, other circuit configurations can be used to equal effect.

In addition, the dazzling laser 40 includes a trigger. The trigger can be, for example, a simple pushbutton switch disposed in a position accessible to the user. Generally, on activating switch, the laser diode 45 is coupled to the power source (not shown) and laser light is generated and directed down the center axis 50 of the bridge 30. For example, the trigger can be disposed on top of the bridge 30 so that it is easily accessible to a user's fingers when naturally gripping the dazzling device 1.

The embodiment of FIG. 1 is intended as a simple-to-use, low cost non-lethal dazzling device 1. A user simply picks up the dazzling device 1, aims it at a hostile target's face by looking down the ocular housings 10, 20 through the eyepieces 16, 17 and activates the dazzling laser 40, resulting in the hostile actor being stunned and temporarily neutralized.

Figure 2:
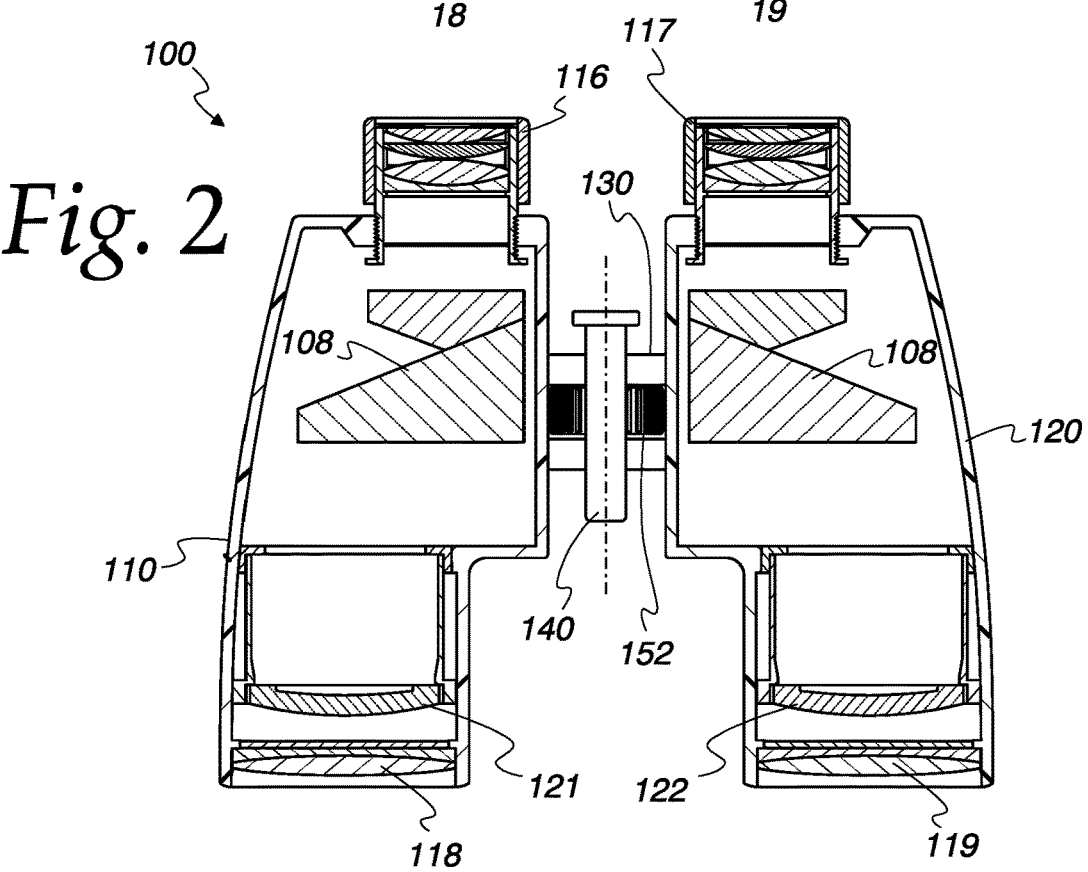
FIG. 2 is a sectional view of the underside of an alternative non-lethal dazzling device constructed in accordance with this disclosure.
Figure 4:
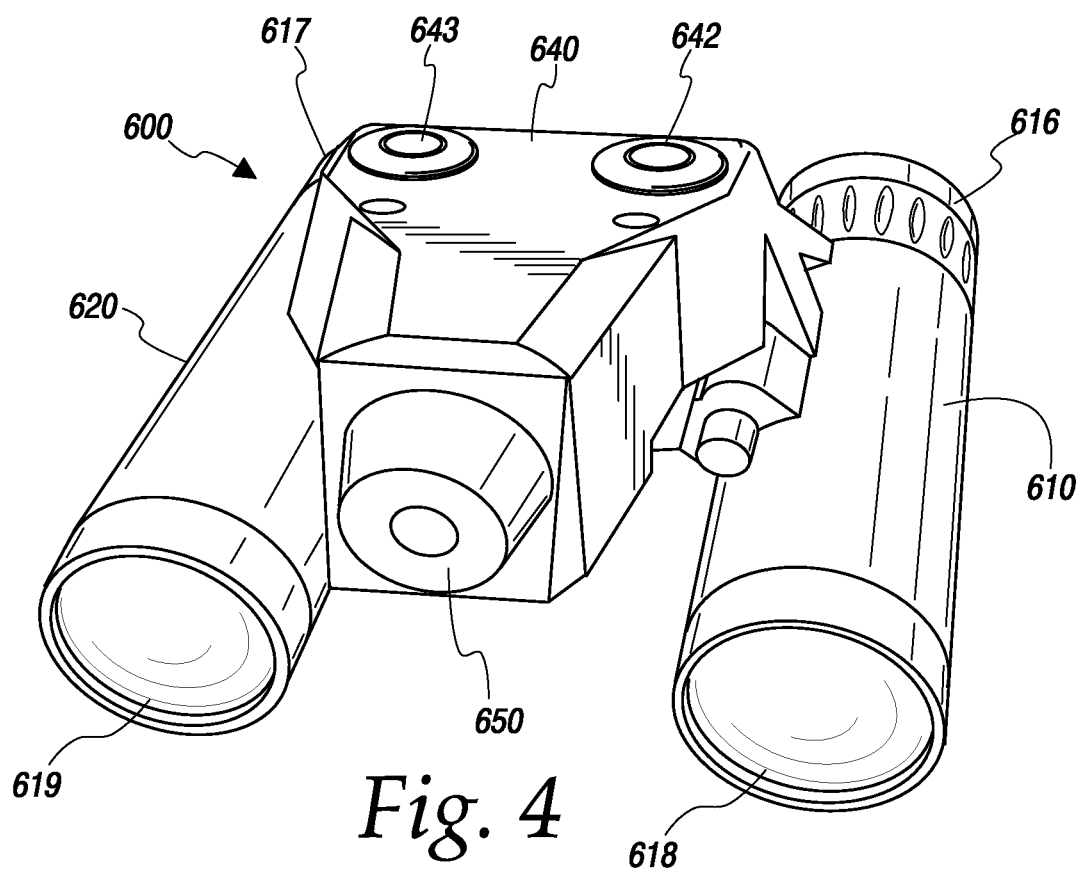
FIG. 4 is a front top perspective view of a non-lethal dazzling device constructed in accordance with this disclosure.
Figure 5:
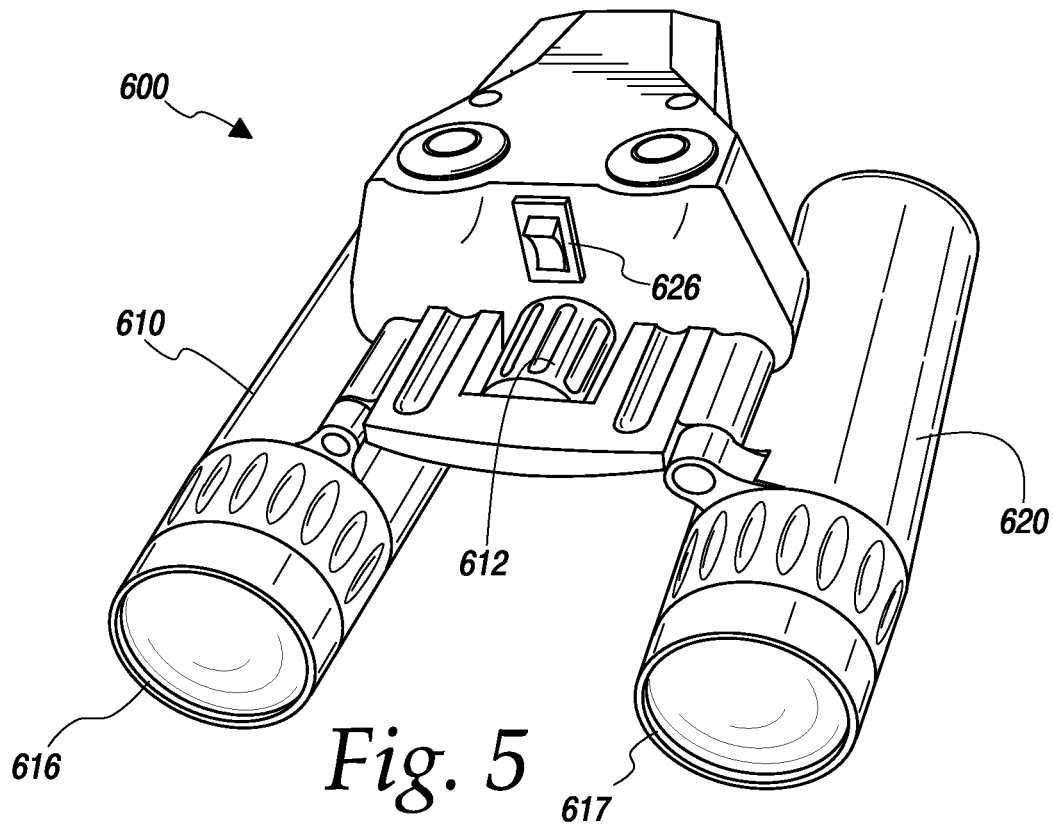
FIG. 5 is a rear top perspective view of a non-lethal dazzling device constructed in accordance with this disclosure.
Figure 6:
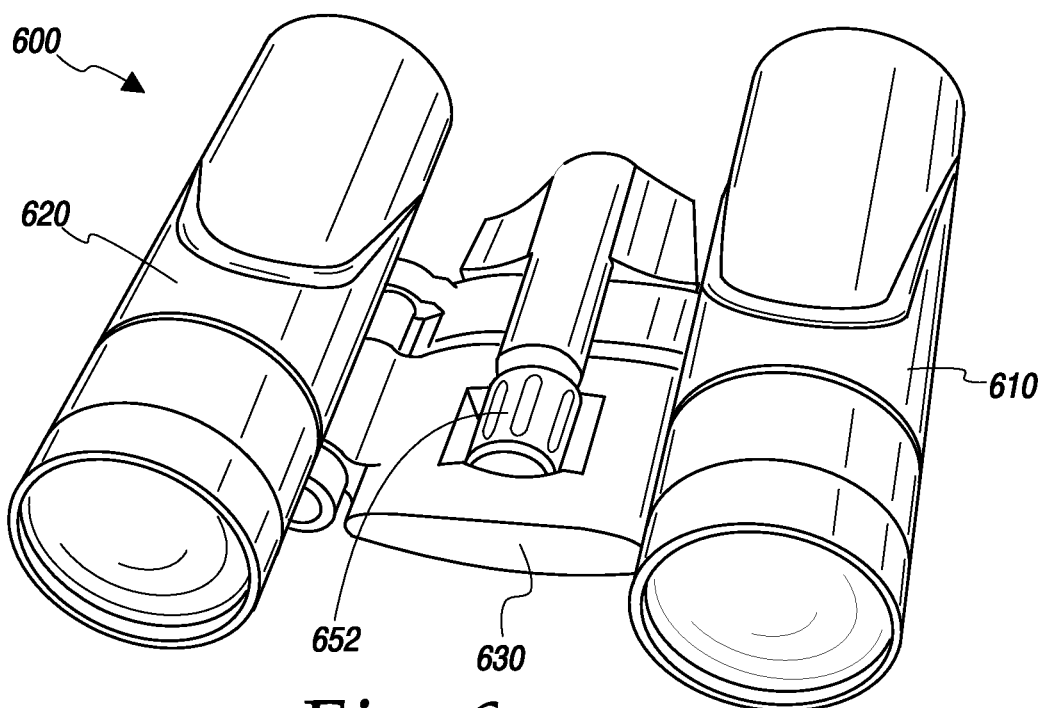
FIG. 6 is a rear bottom perspective view of a non-lethal dazzling device constructed in accordance with this disclosure.

Turning to FIG. 2, a more complicated embodiment of the disclosed non-lethal dazzling device is disclosed. In particular, the embodiment of FIG. 2 allows for the user to focus on the hostile target's face while simultaneously adjusting the power of the laser.

FIG. 2 depicts a sectional illustration of the underside of a non-lethal dazzling device 100. A first housing 110 is coupled to a second housing 120 by a bridge 130. Bridge 130 may be jointed, fixed or releasably raised above, inline or below the optics. Each of the housing elements 110, 120 includes an eyepiece 116, 117, an objective 118, 119, and an axially displaceable focusing element 121, 122. In addition, both housings 110, 120 may include identical prism systems 108 for image inversion. Prism systems 108 may be specially coated to reduce received laser energy that may have reflected from the target.

The segment 130 includes a dazzling laser 140. The dazzling laser can optionally be a low-power laser, such as a Class 3R laser diode with a power output of 1.00 mW, a wavelength of 650 nm (making it a red laser) and adapted to operate off of approximately 5V. Such a laser diode is readily available, and provides the advantage of providing sufficient power for a reasonable range of 25 yards, while not providing sufficient power to cause irreversible retinal disorder to a hostile target's eyes at distances greater than 11 yards. However, given that the output power is adjustable, a higher power output laser can be safely used as long as care is taken to ensure that only a safe power level for a particular range is used. For example, a 250 mW laser having a wavelength of 532 nm (making it a green laser) and adapted to operate off of 5V. Such laser diodes are readily available, and provide the advantage of a far greater range exceeding 500 yards. However, an adjustment mechanism must be used ensure that the power level that is directed at a hostile target's eyes is low enough to not cause irreversible retinal disorder.

In this case, a knob 152 is coupled to the focal components of the optical housing housings 110, 120; i.e., the prism systems 108 and the focus elements 121, 122 using any of the methods known in the prior art, such as transmission rods, etc. In addition, the knob 152 is also coupled to a power adjustment for the laser 140. The power adjustment can be, for example, as simple as a potentiometer, a voltage input to a microcontroller, etc. The power adjustment of the laser is calibrated so that at all distances, when an image is in focus, the power of the laser 140 operable on the hostile target is insufficient to cause irreversible retinal disorder to the target's eyes.

Other components are required for the laser 140 to operate properly. In particular, a power source, such as batteries, and support circuitry, including voltage regulators, current sources, transistors, capacitors, and resistors can be required as well. As with the embodiment of FIG. 1, a push-button switch can be used to activate the laser, and the switch can be mounted on top of the jointed segment 130.

The embodiment of FIG. 2 is intended to provide a longer range non-lethal dazzling device 100. In particular, the dazzling device 100 of FIG. 2 can be operated by a user that must aim the device at a hostile target's face and bringing the same into focus, and activating the dazzling laser 140, resulting in the hostile actor being stunned and temporarily neutralized. To aid in the clear identification of the device to friendly team members, housing 110 and 120 may be painted, molded or otherwise coated in bright or distinctive colors such as blaze orange. Objectives 118 and 119 may be oversized to obscure the identifying marking or color housing from the hostile actor located in front of the device. Housing 110 and 120 may also be flared, expanded, or otherwise modified near objectives 118 and 119 to further mask the bold housing from front view, while still being identifiable from a side view.

Turning to FIGS. 3 and 3a, a still more complicated embodiment of the disclosed non-lethal dazzling device is disclosed. In particular, the embodiment of FIG. 3 integrates electronic circuitry to perform a number of functions. First, the embodiment of FIG. 3 integrates a range finder. A range finder is a laser-based device that typically operates in a non-visible spectrum, such as infrared. The range finder incorporates a transmitter; i.e., a laser diode, and a receiver, such as a silicon avalanche photodiode, or an InGaAs PIN avalanche photodiode (collectively referred to hereafter as a receiver). The output of the receiver is coupled to a microcontroller or microprocessor (collectively referred to hereafter as "processor"), which then adjusts the power level of a coupled dazzling laser using, for example, a digitally controlled potentiometer, pulse width modulation, delta modulation, the manipulation of aperture size, lens adjustments potentially including beam spreading, polarization plates, an algorithm for rapidly enabling and disabling the laser (other than PWM or DM), bias control and other methods known in the art. In a further electronics-based embodiment, a confirmation can be required prior to activation; i.e., the user would have to go through range finding and activation stages as set forth below to ensure that a hostile target's eyes were not exposed to a power level sufficient to cause irreversible retinal disorder to the target's eyes. In addition, another feature that can be incorporated is the use of a facial recognition functions that can inhibit the dazzle effect unless a person's head or face is recognized. The facial recognition could be enhanced by electronically placing a box or other highlight around the potential target(s) in a display for the user. The facial recognition could be further enhanced with electronic muzzle flash location and highlighting. The functions could also include biometric measurements such as verifying pupil to pupil distance or that the target silhouette size matches within a predetermined tolerance (say 15%) to the distance reported by the range finder. As an alternative embodiment to rangefinder 260, the target silhouette size can be compared electronically to a table of silhouette sizes at known distances to determine the range to the target. In addition, as discussed herein, video recording can also be incorporated and stored on the onboard flash memory 267 or external flash memory (not shown). In addition, the target area size can be appreciably increased and the need for aiming accuracy decreased by incorporating laser scanning methods known in the art. In an embodiment, a refraction element is moved in front of the emitter. In another embodiment, galvanometers or electric motors can move a diffraction grating, lensing or the laser diode with relation to a diffraction grating, mirrors, prisms or other methods known in the art to allow the laser to scan a larger target area. In another embodiment, the need for aiming accuracy can be further reduced by electronically designating a target with a lower power laser or electronic highlight displayed to the user and steering the laser to the optimum target location using the aforementioned beam steering in a "fire and forget" process. In another embodiment, multiple emitters in a grid like pattern are mounted on a substrate that simultaneously or sequentially emit to increase the targeting beam area at the target. An example construction incorporates 10000 laser emitters mounted in a 100×100 pattern that would cover an area of two feet by two feet at 20 yards could have the center lasers mounted at 90 degrees to the substrate and the outmost lasers mounted at 90+1.035 degrees offset to the centerline. Lasers approaching the center would be progressively less offset than 90+1.035 degrees until reaching the centerline of 90 degrees to the substrate. The mounting angle may be mixed or reversed from the above arrangement to allow for a variety of manufacturing techniques. In another embodiment, one or more lasers may be used with a light pipe that diverges into several exit apertures. An example construction incorporates a one or more adjustable power output 532 nm lasers emitting into one or more light pipe(s) with 5000 exit points. The exits would have exit angles formed into a grid like pattern to provide coverage of 2 feet by 2 feet at 20 yards. A photolithographic process may have the devices angled in random locations, while a machined base may have regular angles as determined by standard machining processes. The substrate could also be edge emitting wherein the lasers are mounted on the substrate edge providing the necessary offset. This wide aiming angle would make the device suitable for non-steady platforms such as drones or other vehicles in motion.

The embodiment of FIGS. 3 and 3a is similar to the embodiment of FIG. 2, except that its dazzling and optical functions are now electronically controlled. In particular, FIG. 3 depicts a non-lethal dazzling device 200. A first housing 210 is coupled to a second housing 220 by a bridge 230. Each of the housing elements 210, 220 includes an eyepiece 216, 217 and an objective 218, 219. Other optical elements may be included as described with regards to the embodiment of FIG. 2, or as known in the prior art.

Within the bridge 230, a range finder 260 is disposed. As discussed above, the rangefinder includes a transmitter, which is generally a laser diode that is adapted to produce non-visible light, such as infrared. It is anticipated that other methods known in the art of range finding will be suitable including passive autofocus, phase detection, and contrast detection. In addition, the rangefinder may include a receiver, and other components as is known in the art. In addition, the bridge 230 incorporates a dazzling laser 240. The dazzling laser 240 generally will have a power output of tens or more milliwatts, which would generally make the device banned by treaty. However, as disclosed herein, the power adjustment circuit will ensure that the power level that the target is exposed to is low enough so that no irreversible retinal disorder will be done to the target's eyes. In an embodiment, range finder 260 is mounted to determine range to the target, Range finder 260 may also be oriented toward the target and a second range finder (not shown) may be oriented toward the user to ensure the user is holding the device in the correct orientation with 216 and 217 toward the user and 218 and 219 toward the target. In an embodiment, the forward facing range finder would need to detect a range greater than the longest arm's length of about four feet, and the rear range finder would need to detect a range less than 1 foot to ensure the dazzler is in the correct orientation to prevent self-dazzling of the operator Both the dazzling laser 240 and the rangefinder 260 are coupled to a processor 265. The processor 265 requires certain support circuitry, including RAM 266 and FLASH 267. It should be noted that other types of storage, such as magnetic RAM, may be viable in the future, and the specific type of short-term and long-term memory that is utilized is not intended as a limitation of the disclosure unless it is expressly claimed. The processor 265 is coupled to a power adjustment 245 circuit, which controls the power level of the dazzling laser 260. In addition, the processor 265 is coupled to a photosensor 270, to record video of the image that the user would observe from one of the optical lenses, such as the eyepiece 216 of the left housing 210. The video display may also be used for electronic target designation where a box or other highlight could be placed on electronically recognized targets using image recognition techniques known in the art, such as muzzle flash, firearms, or other suitable targets or conditions. The user may scroll through the highlighted targets by touching trigger 280 for a second predetermined time period or scroll using an additional target selector control similar to 280 such as a joystick, spin-wheel, or the like may be added. It is anticipated that targeting may also be completely under device software or remote-control using wireless communication methods such as 5G or similar protocols known in the art. A similar mechanism would allow a video display 275 from photosensor 270 to be shown to one of the optical lenses, such as the eyepiece 216 of the left housing 210. A focus dial 252 is disposed in the jointed bridge 230 as well; the method of operation of the focus can be similar to that of FIG. 2, or can operate in any other way known in the art, including entirely digitally, thus minimizing potential effects to the operator should reflective surfaces be targeted. Finally, the processor 265 is coupled to a trigger 280, which can be, as previously described, a push button switch disposed on the top of the bridge 230 where a user's fingers would naturally be disposed when handling the device non-lethal dazzling device 200. In addition, a battery 284 provides power to the electronic components.

In operation, a user would pick up the non-lethal dazzling device 200 and aim the device 200 at a hostile target (not shown). Once the hostile target's face was in focus (after electronic focus or using the focus dial 252), the user would press the trigger 280 a first time activating the transmitter (not shown) of the range finder 260. The receiver (not shown) of the rangefinder 260 would report a range to the processor 265. The processor 265 would then update the display 275 so as to notify the user that the dazzling laser is going to be activated. This will allow the user to ensure that the hostile target is still at approximately the same range as when s/he activated the rangefinder, and that no targets are closer than the hostile target, and therefore in danger of suffering irreversible retinal disorder. If the user presses the trigger 280 a second time within some predetermined amount of time, such as 5.0 seconds, the processor activates the dazzling laser 240 after programming the power adjustment circuit 245 so as to ensure that the equivalent power disposed on the hostile target's eyes is at a level that will dazzle the hostile target without causing irreversible retinal disorder to the hostile target's eyes. The above process may also be software controlled whereby the processor inhibits the dazzling laser until range is confirmed by the processor and the laser is turned on at eye safe power levels as soon as the processer confirms distance at the first button press. Additional embodiments may inhibit the laser until a beam steering mechanism can be electronically confirmed to be optimally on target to say 0.1 inches at 100 yards. Other embodiments include multiple single button presses or the pressing of a number of buttons, say 5, in a predetermined sequence.

The potentially high-power output of the dazzling laser 240 allows the device 200 to be used at long ranges, such as more than 100 yards. In addition, the high power output of the dazzling laser 240 can also be useful if countermeasures, such as special glasses, are used, or if the environment contains smoke or dust that would affect the received power level. In such a case, a high power override can be incorporated, allowing the user to manually to set the power level by, for example, holding the trigger 280 while adjusting the focus dial 252. In an additional embodiment, the built-in optics, electronics, and/or video processing may autodetect faces, muzzle flashes, weapons or the like and provide the user with electronic highlighting around the target using a display. The electronics may also detect the presence of countermeasures or airborne contaminants and automatically adjust the power, frequency, frequency hopping, beam steering, or other beam properties to a predetermined different, but still eye safe, profile for the current environment or countermeasures.

Figure 7:
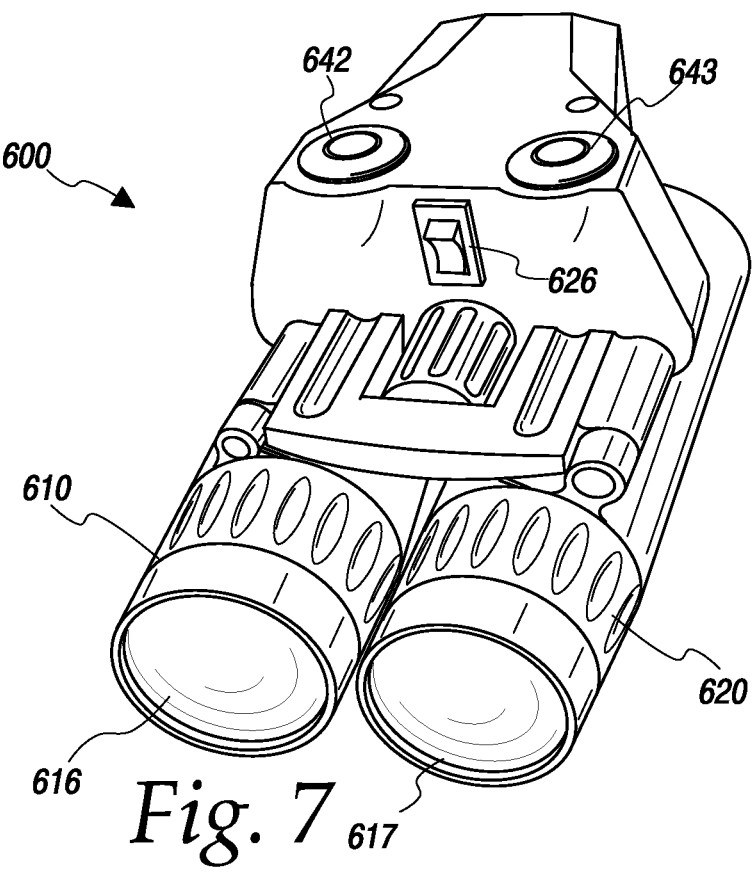
FIG. 7 is a rear perspective view of a non-lethal dazzling device in a compressed form.

Turning to FIGS. 4-7, the underside of an additional non-lethal dazzling device 600 constructed in accordance with this disclosure is depicted. A first housing 610 is joined to a second housing 620 by a bridge 630. The bridge 630 incorporates a focal mechanism that can be constructed similar to those that were disclosed with previous embodiments, and which can be controlled by knob 652. As depicted, bridge 630 is jointed, so that the first housing 610 and second housing 620 can be collapsed into a smaller space as depicted in FIG. 7. Both housing elements 610 and 620 include elements similar to those shown in the embodiment of FIG. 2, including an eyepiece 616, 617, an objective 618,619, focal elements (not shown), and prism systems (also now shown) if image inversion is required.

Mounted on top of the bridge 630 is a dazzling module 640. The dazzling module 640 includes a power switch 626, a first button 642, and a second button 643. The power switch 626 turns the dazzling module 640 "on" or "off." As explained below, the first button 642 activates the dazzling module 640 in low power mode, while the second button 643 activates the dazzling module 640 in high power mode. The dazzling module further includes a dazzling laser 650. This particular embodiment could employ a wavelength of 532 nm, making it a green laser, with a power output of 4.9 mW. The drive circuit of the laser is adapted to limit the actual power output of the laser so that the effective safe dazzling range of the laser would be limited to 50 yards when activated in low power mode (the first button 642), and more than 150 yards when activated in high power mode (the second button 643).

Typically, the way that a user would utilize the non-lethal dazzling device 600 disclosed in FIGS. 4-7 would be to point the non-lethal dazzling device 600 at the hostile actor and use the focal knob 652 to acquire the hostile actor's face. Once the hostile actor's face is in focus, the user would then press either the first button 642, if the user is less than 50 yards away, or the second button 643 if the user is more than 200 yards away. The distances and power levels are example distances, and it is anticipated that dazzlers would be made with ranges for typical structures such as churches or shopping malls.

Figure 8:
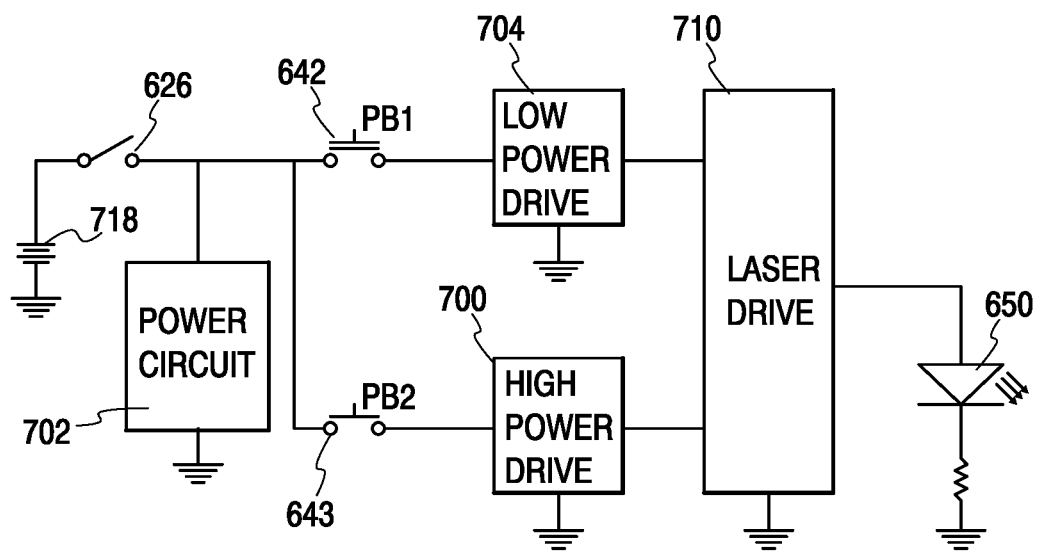
FIG. 8 is an exemplary simplified schematic circuit diagram of a dazzling circuit for use with a non-lethal dazzling device constructed in accordance with this disclosure.

Turning to FIG. 8, a simplified schematic block diagram for the embodiment of dazzling module 640 disclosed in FIGS. 4-7 is illustrated. A switch 626 couples a battery 718 to a power circuit 702, which provides power to the remaining components of the dazzling module. The power circuit 702 can be implemented in a variety of means known in the art, such as a switching power supply, or a simple linear supply circuit. A first pushbutton switch 642 serves to couple a low power drive circuit 704 to Laser Drive 710, while a second pushbutton switch 643 couples a high power drive circuit 706 to the Laser Drive 710.

The low power drive circuit 704 programs the Laser Drive 710 to limit the power to the laser 650, while the high power drive circuit 706 allows the Laser Drive 710 to provide the maximum permissible power to the laser 650. The low power drive circuit 704 and high power drive circuit 706 may provide analog inputs or digital inputs to the Laser Drive 710, whose operation is similarly bound only by the prior art. Finally, the Laser Drive 710 powers the Laser 650, which will produce an appropriate intensity beam.

Figure 9:
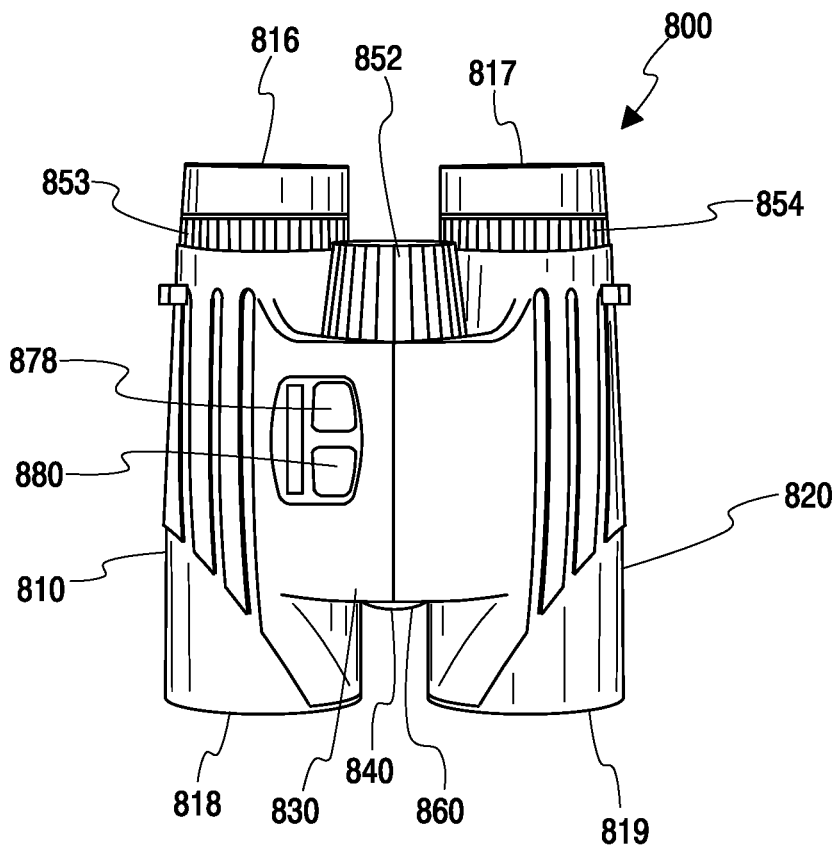
FIG. 9 is a top perspective view of a non-lethal dazzling device constructed in accordance with this disclosure.
Figure 10:
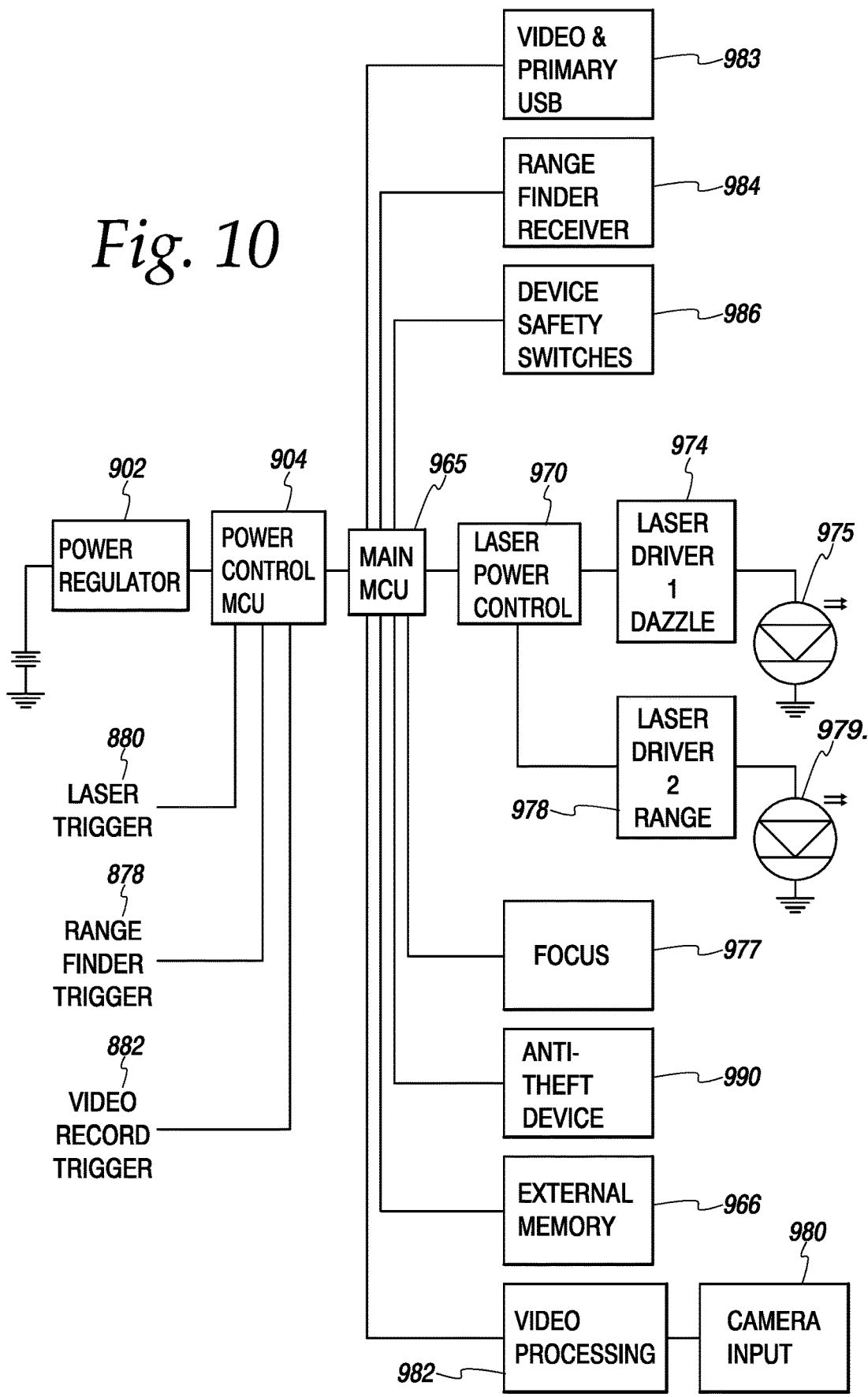
FIG. 10 is an exemplary simplified schematic circuit diagram of a dazzling circuit for use with a non-lethal dazzling device constructed in accordance with this disclosure.

FIGS. 9 and 10 discuss an embodiment that is similar to that disclosed in FIGS. 3 and 3a. In particular, FIG. 9 depicts a non-lethal dazzling device 800 that includes a first housing element 810 and a second housing element 820. The first housing element 810 is coupled to the second housing element 820 by a bridge 830. As depicted, the bridge 830 is jointed and incorporates an articulating hinge, which allows the non-lethal dazzling device 800 to be compressed into a smaller form factor for storage. The first housing element 810 includes an eyepiece 816 and an objective 818. The second housing element 820 includes an eyepiece 817 and objective 819. The first housing element 810 also includes a diopter focus 853, and the second housing element 820 includes a diopter focus 854. Other optical elements can be included as described with regards to the other embodiments disclosed herein, or as known in the prior art.

The bridge 830 includes a range finder 860. The rangefinder 860 can be similar to that disclosed with regards to the embodiment of FIGS. 3 and 3a. The bridge 830 also includes a dazzling laser 840. The laser 840 can have, for example, a power output of 4.9 mW with a wavelength of 532 nm making it a green laser. It is anticipated to minimize the profile of the complete device that Laser 840, rangefinder 860, photosensor 270 and all other associated components could be contained inside of the first housing element 810 or the second housing element 820 with the corresponding image displayed to the user on video display 275.

Turning to FIG. 10, a simplified schematic diagram of a circuit for use with the non-lethal dazzling device 800 disclosed in FIG. 9 is illustrated. A battery 918 provides power to a power regulator 902, which provides power to power saving processor 904 which keeps the dazzler in very low power mode until activated, say five microwatts, yielding a typical lithium battery cell standby life of more than five years. Lower standby power modes can be achieved through the use of isolating electronics, mechanical switching or the use of relays or other similar mechanisms. The power processor 904 accepts inputs from a laser trigger 880, a range finder trigger 878, and a video recorder trigger 882. The power processor 904 is coupled to the main processor 965. The main processor 965 can incorporate its own storage, including random access memory for computations and short-term storage, and FLASH memory for long term storage. The main processor 965 can also incorporate its own support circuitry. However, given the ability to record video, at least some external memory 966 will be required. The external memory 966 can include FLASH memory, magnetic RAM, or other types of storage.

The main processor 965 further controls a laser power control circuit 970. The laser power control circuit 970 can be programmed via analog inputs generated by the main processor 965, or via digital commands. The laser power control circuit 970 controls a number of laser drive circuits (there are two illustrated). In the illustrated embodiment, the laser power control circuit 970 controls two laser drive circuits; a first laser drive circuit 974 which drives a first laser 975 and a second laser drive circuit 978 which drives a second laser 979. For example, the first laser drive circuit 974 and first laser 975 may be adapted for close range dazzling, while the second laser drive circuit 978 and second laser 979 may be adapted for longer range dazzling. Alternately, second laser 979 may be adapted for transmission and range finding the target in conjunction with range finding receiver 984. Alternately, second laser 979 may be adapted to supplement first laser 975 by being offset by a typical interpupil distance, or may provide a more divergent or less divergent beam then first laser 975. The main processor 965 is also connected to a range finder receiver 984 which functions as discussed previously with other embodiments.

The main processor 965 can automatically program the laser drive circuit based on input from the focus 977, the rangefinder 984, or a combination thereof. As discussed above, the rangefinder receiver 984 could report a range of an object, and the main processor 965 could set the power via the laser power control 970 appropriately. Alternatively, the main processor 965 could monitor the setting of the focus 977 and use that as the primary means to program the laser power control 970. In such a case, the video processing circuitry 982 could implement a Gaussian Filter, or other mechanism known in the art to ensure that the object being aimed at is actually in focus—this would prevent accidental or intentional irreversible retinal disorder.

The main processor 965 also controls a video recording circuit, which can comprise a camera 980 as well as video processing circuitry 982. Camera 980 and video processing circuitry 982 may also be used to detect rapid movement of the dazzling device using well known video processing techniques. The video processing circuitry 982 and main processor 965 would reduce or turn off laser driver 974 until the dazzler stabilized and range finder 984 could report stable distance to processor 965. It should be noted that digital cameras and image processing are well known in the art at this point, and any suitable prior art mechanism can be used. The video processing circuitry 982 can also be used to detect when the non-lethal dazzling device 800 is quickly moved; for example, a user may have focused on a hostile actor 200 yards away, and then suddenly turned to her left to focus on a potential hostile actor 10 yards away—if the laser is maintained at the same intensity, it could damage the potential hostile actor's eyes, so the video processing circuitry 982 could act to disable the laser until a proper range is calculated using the mechanisms discussed herein. Additionally, any suitable inertial sensor such as an electronic compass, accelerometer, electronic gyroscope or the like could be used and incorporated into device safety switches 986, thus preventing the operation of the dazzling laser unless the rangefinder and power level was at a correct level.

The main processor also couples to input/output port 983, which can be used to access recorded video or to program the non-lethal dazzling device 800 with software updates, settings, etc. The port may operate in a wired fashion say USB, JTAG, RS488 or wirelessly, say Wi-Fi, 5G, Bluetooth or inductive coupling. Similarly, the main processor 965 monitors an anti-theft device 990, which, when active, will cause the processor 965 to prevent any functioning of the non-lethal dazzling device 800. Anti-theft device 990 may use any of the anti-theft features known in the art. For example, anti-theft device 990 may allow a remote device, such as a smartphone or a server, to send a signal to the anti-theft device 990 over a wireless network that would disable the non-lethal dazzling device 800. Alternatively, anti-theft device 990 may only operate if it detects a signal or response from a second device, such as a base station or an RFID device. Alternatively, anti-theft device 990 may utilize geo-fencing; i.e., it will only operate if it is placed in a particular bounded area or areas. Anti-theft device 990 can make use of various biometric authentication mechanisms, such as a finger print reader, voice recognition, face recognition, etc. It should be noted that various other means known in the art can also be used by the anti-theft device 990. In addition, the main processor 965 monitors one or more device safety switches 986 such as housing interlocks used to turn off the laser and associated circuitry if any user service covers are opened.

In practice, a user would pick up the non-lethal dazzling device 800 and aim the device 800 at a hostile target (not shown). The user would then use the center focus dial 852 or the diopter focus dials 853, 854 to bring the hostile target's face into focus. The user then presses the range finder trigger 878 activating the transmitter of the ranger finder 979. The ranger finder receiver 984 would then a report a range to the main processor 965. The main processor 965 may notify the user that the dazzling laser is going to be activated by, for example, flashing an LED, or activating an audible chip using a speaker (not shown). This will allow the user to ensure that the hostile target is still at approximately the same range as when s/he activated the rangefinder, and that no targets are closer than the hostile target, and therefore in danger of suffering irreversible retinal disorder. The user would then press the laser trigger 880 to activate the non-lethal dazzling device 800. The main processor 965 then programs the laser power control 970 and activates the appropriate laser drive circuit and the appropriate laser. In one embodiment, the main processor 965 selects the laser drive circuit and laser based on the range information received by the range finder receiver 984. In another embodiment, focusing operations are fully automatic using well known automatic focus techniques.

The potentially high-power output of the non-lethal dazzling device 800 allows the device 800 to be used at long ranges, such as more than 100 yards. In addition, the high power output of the non-lethal dazzling device 800 can also be useful if countermeasures, such as dark sunglasses, are used, or if the environment contains smoke or dust that would affect the received power level.

The previously disclosed non-lethal dazzling device embodiments are targeted to military and law-enforcement personnel, as well as other trained users. In particular, the previously disclosed embodiments are designed to be used at range by trained users that are able to target a hostile actor's face. However, the principles of a non-lethal dazzling device can also be applied to a device intended for use by the general populace. The advantage of such a device are readily apparent. In particular, a general-purpose device could be used by a person in a typical self-defense situation, i.e., when unexpectedly confronted by a hostile actor.

Figure 11:
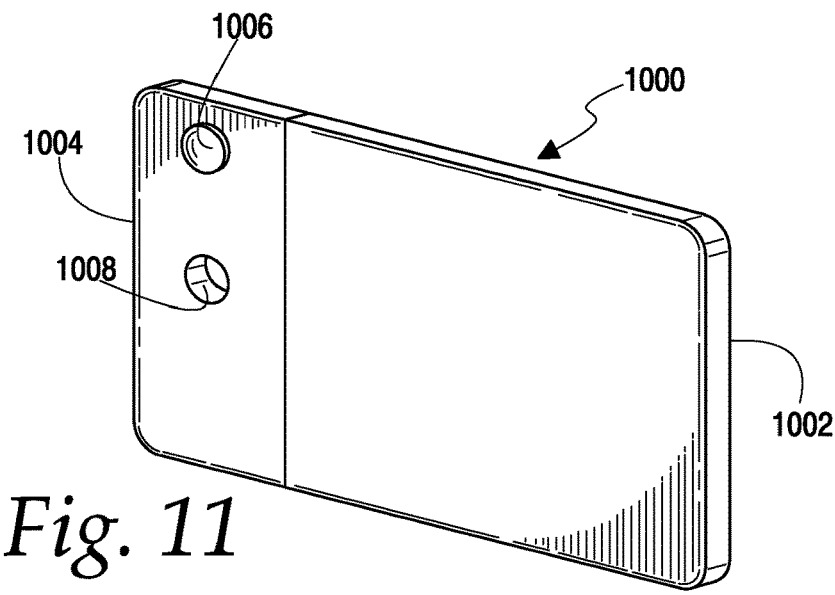
FIG. 11 is a front perspective view of a personal non-lethal dazzling device constructed in accordance with this disclosure.
Figure 11A:
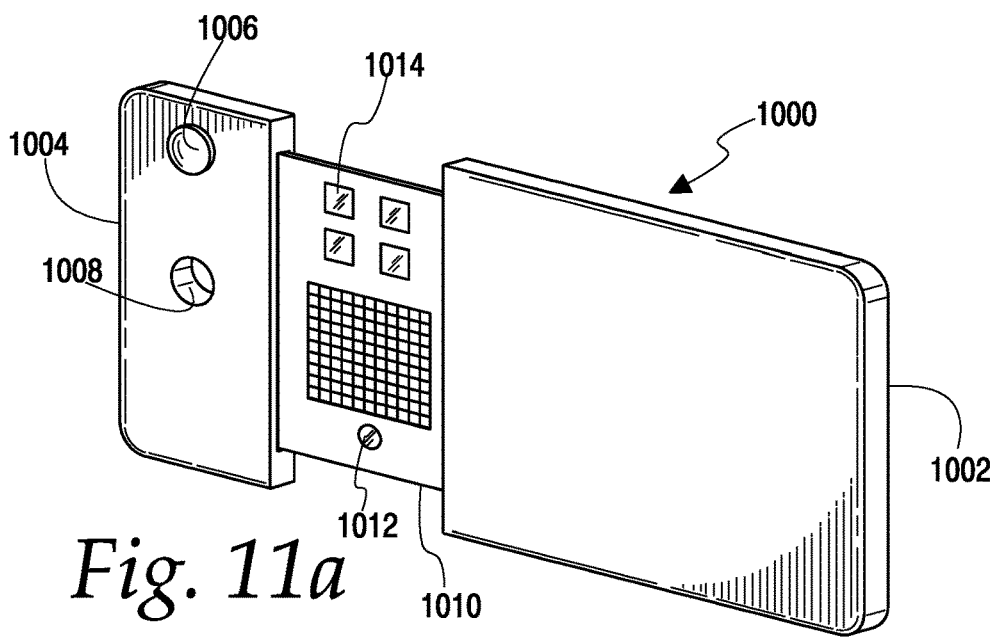
FIG. 11a is a second front perspective view of a personal non-lethal dazzling device constructed in accordance with this disclosure.

The non-lethal dazzling device disclosed in FIG. 11 is one potential embodiment of a personal non-lethal dazzling device 1000. In particular, the personal non-lethal dazzling device 1000 incorporates a back housing 1002 and a front housing 1004. The front housing 1004 is slideably coupled to the back housing 1004, so that the front housing 1004 can slide away from the back housing as depicted in FIG. 11a. When the front housing 1004 is slid away from the back housing 1002 an internal panel 1010 is exposed. When the personal non-lethal dazzling device 1000 is in its most compact form, it could be sized to be the same size as a credit card when laid flat, and of the same thickness as 2-4 typical credit cards laid on top of one another. This will allow the personal non-lethal dazzling device 1000 to be stored in a pocket, common wallet or money clip, so that the personal non-lethal dazzling device 1000 can be concealed from view until needed.

The front panel 1004 includes a trigger 1006, which in this case is a simple button. The front panel also includes a lanyard hole 1008. Turning to the user panel 1010, the user panel includes an aiming aid 1014, which is disposed above a laser array 1016. In an embodiment, aiming aid 1014 is a simple cutout window. In other embodiments, aiming aid may be a lens, electronic viewfinder, camera, or other targeting aids known to the arts. The laser array 1016 could comprise an array of a number, such as forty-nine, separate lasers, although a different number of lasers could also be used. In such a case, each of the lasers could be, for example, a class 1 laser, or a class IIa laser operating at 532 nm with a total power output of less than 1 milliwatt each. Alternatively, a single higher power laser along with a lensing system, such as a beam-spreader, light pipes or other beam expanding techniques discussed herein, could be used as the laser array 1016. In such a case, a 532 nm laser with a power output of 4.9 milliwatts or greater could be used, along with a suitable beam-spreader technique.

The user panel 1010 also includes a proximity sensor 1012. The proximity sensor 1012 can be, for example, an infrared or ultrasonic proximity sensor. The proximity sensor 1012 is primarily intended to prevent operation of the personal non-lethal dazzling device 1000 when a person is within close proximity to the device. For example, the proximity sensor 1012 may inhibit operation when any object is detected within 0.5 meters of the proximity sensor.

Proximity sensor 1012 may also be duplicated on the back side and operate in conjunction with front side proximity sensor to prevent operator self-dazzling. These minimum distances front to the target and rear to the user of say a minimum of four feet to the front and a maximum of one foot to the rear can help prevent a user from dazzling him or herself with the personal non-lethal dazzling device 1000 or from operating the personal non-lethal dazzling device 1000 in circumstances where it could cause irreversible retinal disorder.

Figure 12:
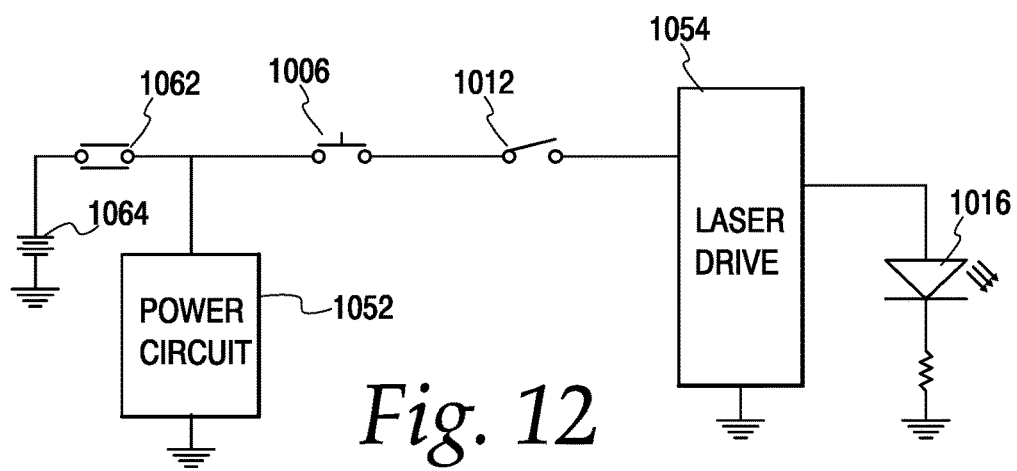
FIG. 12 is an exemplary simplified schematic circuit diagram of a dazzling circuit for use with a personal non-lethal dazzling device constructed in accordance with this disclosure.

Turning to FIG. 12, an exemplary simplified circuit diagram that implements the personal non-lethal dazzling device 1000 is depicted. In particular, the circuit includes a battery 1064. The battery 1064 is sized to allow for a reasonable number of uses, such as, for example, 500 uses, and will have suitable durability, such as a ten-year life. The battery 1064 could be replaceable or permanent. A slider switch 1062 is coupled between the battery 1064 and a power circuit 1052. The power circuit 1052 is adapted to provide conditioned power to the remaining components of the circuit, and can operate using any of the ways known in the art, such as via a linear regulator or a switching power supply.

A pushbutton 1006 operates to activate the personal non-lethal dazzling device 1000. The proximity sensor 1012 acts as a switch, disabling the device when an object is detected in close proximity. Finally, a laser drive 1054 powers a laser array 1016. The laser drive 1054 can operate as previously disclosed herein. In an alternative embodiment, proximity sensor 1012 may be a range finder as previously disclosed herein and provide ranging information to adjust the output of dazzling laser as previously disclosed herein.

In operation, a user will take the personal non-lethal dazzling device 1000 out of storage; i.e., out of the user's purse, wallet, money clip, pocket, etc., and slide the front housing 1004 away from the back housing 1002. The user will then use the aiming aid 1014 to target the hostile actor. The proximity detector 1012 will allow operation of the personal non-lethal dazzling device 1000 as long as no object is within 0.5 meters of the proximity detector 1012 in the direction the proximity detector 1012 is facing. Once the hostile actor's face is targeted, the user will use the trigger 1006 to activate the laser array 1016, which will either dazzle or at least warn the hostile actor, depending on the range from the hostile actor to the activated device.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. It should also be noted that a variety of the features discussed herein. may be combined with other features discussed herein. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A non-lethal handheld dazzling device comprising:
   a housing having a forward-facing direction and a rear-facing direction;
   a processor disposed in the housing;
   a forward-facing range finder, the range finder producing a distance to target signal;
   a dazzling module coupled to the housing, the dazzling module comprising:
   a first laser emitter oriented in a direction that is offset no more than 1.035 degrees from the forward facing direction;
   a second laser emitter offset less than 1.035 degrees from the first laser emitter;
   a laser drive circuit; and
   a trigger operatively coupled to the laser drive circuit whereby the laser drive circuit is activated by an activation of the trigger and produces a laser drive power proportional to the distance to the target signal;
   wherein the laser drive circuit powers the first and second laser emitters.

2. The non-lethal handheld dazzling device of claim 1 wherein the laser drive circuit powers the second laser emitter sequentially after the first laser emitter.

3. The non-lethal handheld dazzling device of claim 1 wherein the laser drive circuit powers the second laser emitter simultaneously with the first laser emitter.

4. The non-lethal handheld dazzling device of claim 1 wherein the housing is substantially rectangular.

5. The non-lethal handheld dazzling device of claim 1 wherein the dazzling module is disposed within the housing.

6. The non-lethal handheld dazzling device of claim 1 wherein the housing has a rearward facing direction and a rearward-facing range finder coupled to the processor.

7. A non-lethal handheld dazzling device comprising:
   a housing having a forward-facing direction and a rear-facing direction;
   a processor disposed in the housing;
   a dazzling module coupled to the housing, the dazzling module comprising;
   a first laser emitter oriented in a direction that is offset no more than 1.035 degrees from the forward facing direction;
   a second laser emitter where the emitter is offset less than 1.035 degrees from the 1st laser emitter;
   a laser drive circuit; and
   a trigger operatively coupled to the laser drive circuit whereby the laser drive circuit is activated by an activation of the trigger and produces a laser drive power;
   wherein the laser drive circuit powers the plurality of laser emitters.

8. The non-lethal handheld dazzling device of claim 7 wherein the laser drive circuit powers the second laser emitter sequentially after the first laser emitter.

9. The non-lethal handheld dazzling device of claim 7 wherein the laser drive circuit powers the second laser emitter simultaneously with the first laser emitter.

10. The non-lethal handheld dazzling device of claim 7 wherein the housing is substantially rectangular.

11. The non-lethal handheld dazzling device of claim 7 wherein the dazzling module is disposed within the housing.

12. The non-lethal handheld dazzling device of claim 7 wherein the housing has a rearward facing direction and a rearward-facing range finder coupled to the processor.

13. A non-lethal handheld dazzling device comprising:
a housing having a forward-facing direction and a rear-facing direction;
a processor disposed in the housing;
a forward-facing range finder coupled to the processor, the range finder producing a distance to target signal;
a dazzling module coupled to the housing, the dazzling module comprising;
a substrate disposed in the dazzling module and mounted substantially in the forward facing direction;
at least one laser emitter mounted obliquely to the substrate;
a laser drive circuit; and
a trigger operatively coupled to the laser drive circuit whereby the laser drive circuit is activated by an activation of the trigger and produces a laser drive power;
wherein the laser drive circuit powers the laser emitter.

14. The non-lethal handheld dazzling device of claim 13 wherein the housing is substantially rectangular.

15. The non-lethal handheld dazzling device of claim 13 wherein the dazzling module is disposed within the housing.

16. The non-lethal handheld dazzling device of claim 13 wherein the housing has a rearward facing direction and a rearward-facing range finder coupled to the processor.

* * * * *